F. TAYLOR.
WHEEL STRUCTURE.
APPLICATION FILED JULY 12, 1915.

1,262,138.

Patented Apr. 9, 1918.
2 SHEETS—SHEET 1.

Witnesses:
A. L. Lord.
D. Torr.

Inventor.
Fred Taylor
B. W. Brockett
Atty.

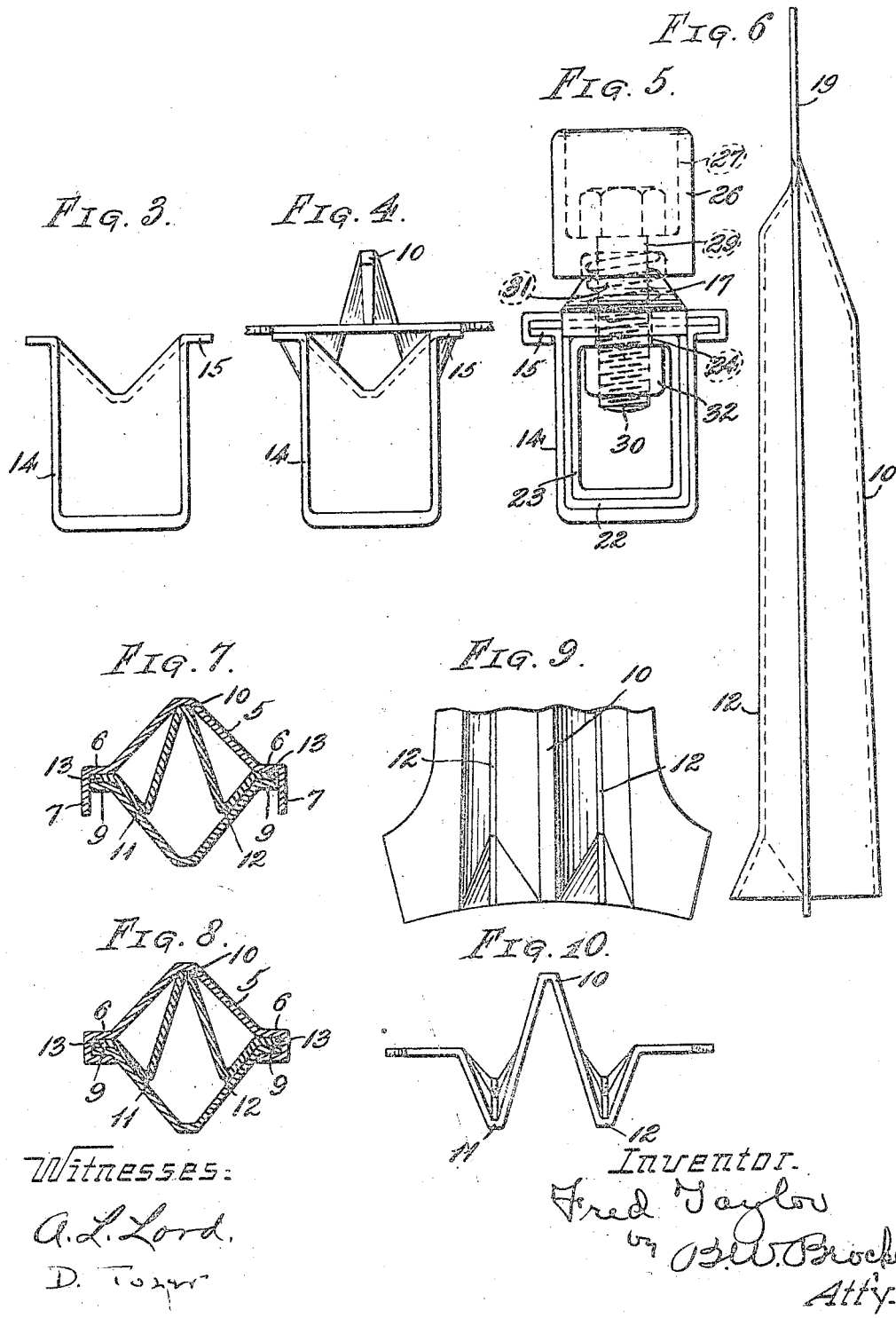

UNITED STATES PATENT OFFICE.

FRED TAYLOR, OF CLEVELAND, OHIO.

WHEEL STRUCTURE.

1,262,138.  Specification of Letters Patent.  Patented Apr. 9, 1918.

Application filed July 12, 1915.  Serial No. 39,319.

*To all whom it may concern:*

Be it known that I, FRED TAYLOR, a citizen of the United States, residing at Cleveland, in the county of Cuyahoga and State of Ohio, have invented certain new and useful Improvements in Wheel Structures, of which the following is a specification.

This invention relates generally to wheels and particularly to that class of such devices made up of stamping and utilized for motor vehicles.

More specifically the invention relates to a wheel comprising a rim, a hub and a stamped steel web structure made up of a plurality of spoke sections, each comprising a pair of stamped spoke sections secured together by marginal crimping and having between them a bracing member transversely corrugated, and extending longitudinally of the spoke, each spoke structure having a rim receiving portion coöperating with a removable rim clamp.

The invention may be further briefly summarized as consisting in the construction and combination of parts hereinafter set forth in the following description, drawings and claims.

Figure 1:
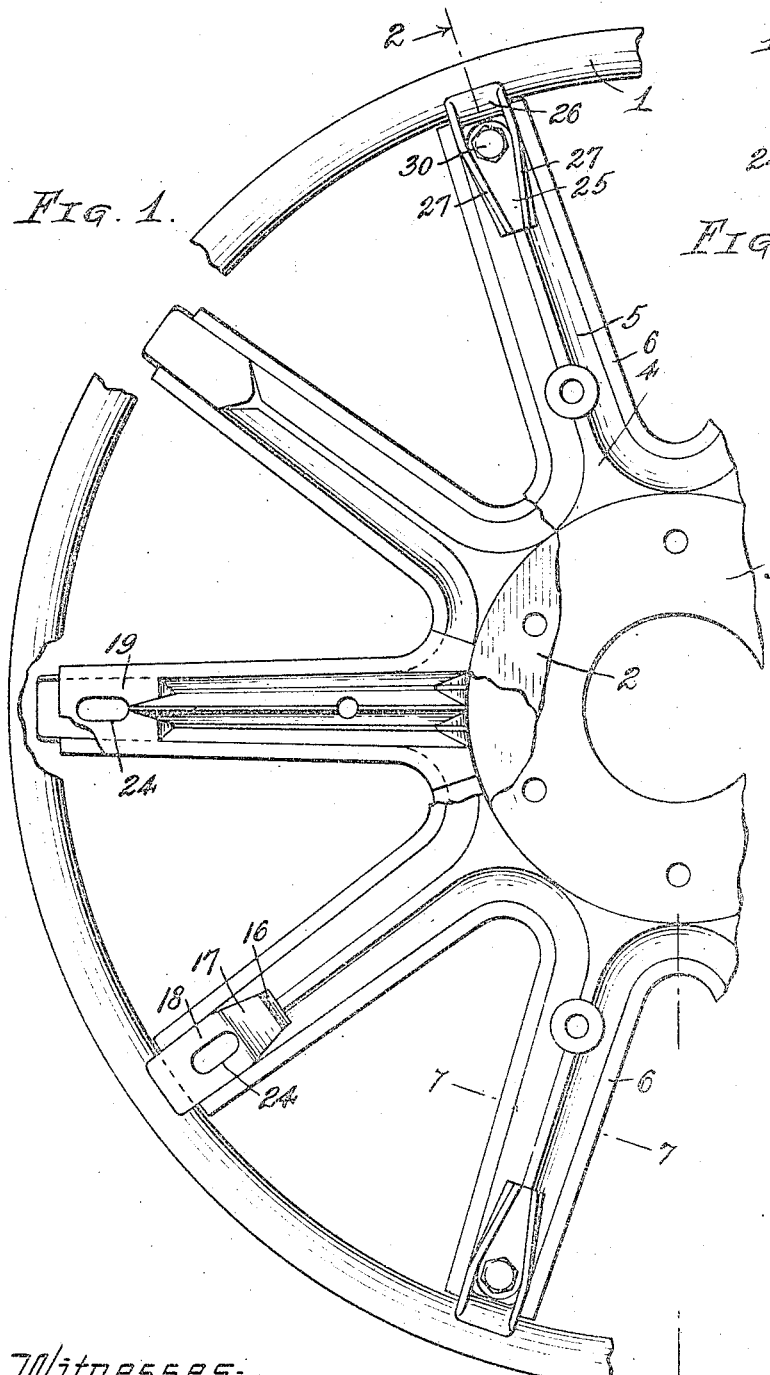
Figure 2:
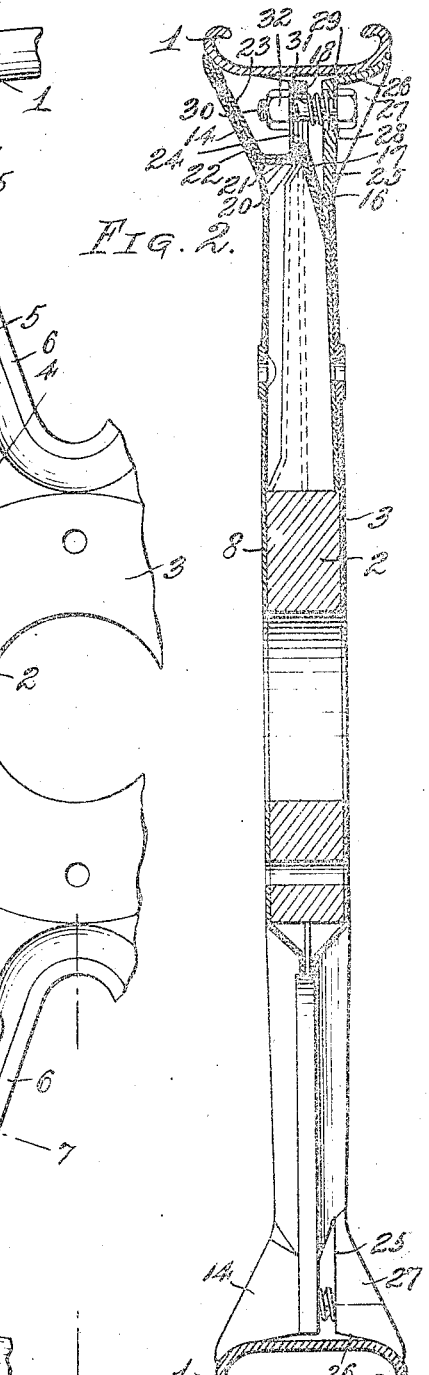

Referring to the drawings, Figure 1 is a side elevation of a portion of a wheel constructed according to my invention; Fig. 2 is a vertical section taken through one spoke and to the side of the other upon the line indicated at 2—2 in Fig. 1; Fig. 3 is a plan view of one end of the rear spoke casing; Fig. 4 is a similar view showing the bracing member in place; Fig. 5 is a similar view showing the rim receiving parts; Fig. 6 is a side elevation of the bracing member; Fig. 7 is a section upon the line 7—7 of Fig. 1 before the flanges of the front casing member are bent back around the flanges of the rear casing member; Fig. 8 is a similar view with the flanges bent into place; Fig. 9 is a side elevation of the lower portion of the bracing member as viewed from right to left in Fig. 6; and Fig. 10 is a bottom plan view of this portion of the bracing member.

In the embodiment shown in the drawings, 1 represents a rim of any preferred type having curved under marginal faces, as shown, such as a clencher rim of a motor vehicle, and 2 is a hub filler block or member of wood or any other suitable material. This filler block merely operates as a spacing member for the side web casing or plates. It also serves to hold the bracing members in place, as will appear.

The rim and the hub are united by a web structure comprising a front web member having a central hub engaging portion 3 and radially extending spoke casing portions 4. Each of these casing portions 4 has inclined sides 5 merging into flat flanges 6 at the sides, and these flanges are integral with crimping flanges 7 for a purpose to be described. The crimping flanges 7 extend at right-angles to the flanges 6 in the finished stamping, so that they will be in a position to be crimped around the other parts, as will appear. The opposite or rear side of the wheel is provided with a similar web member 8 except that its laterally extending flanges 9 terminate within the crimping flanges 7, as is clearly shown in Fig. 7, so that the crimping flanges may be crimped around them.

Within each spoke casing, as formed by the casing portions of the two web members is a bracing member extending longitudinally of the spoke and comprising a central longitudinally disposed angular shaped rib 10 adapted to seat in the recess within the front casing portion of the front web member, as shown in Fig. 7. The sides of this rib extend toward the inclined sides of the opposed casing portion of the spoke and are at these points provided with a pair of ribs 11 and 12, one side of each of which nests along the inclined sides of the rear casing portion of the rear web member. The outer sides of these two ribs 11 and 12 terminate in marginal bracing member flanges 13 adapted to engage between the flanges 6 and 9, as shown clearly in Fig. 7. When this bracing member is in place, the crimping flanges 7 are crimped around the back of the flange 9 producing the finished spoke.

The spoke casing portions of the front and rear web members are worked into a rim engaging jaw, and it comprises an outer jaw casing 14 formed from the spoke casing portion of the rear web member and it extends outward and is curved at its outer edge to fit the curved under marginal portion of the rim, as is shown in Fig. 2. The end of this outer casing is shown clearly in Figs. 3, 4 and 5. This jaw casing is provided with laterally extending flanges 15 which form continuations of the flanges 9.

The front spoke casing portion at the rim jaw structure is provided with an inclined shoulder 16, shown in Fig. 2, for a purpose to be described, and a further inclined portion 17 conforming to the configuration of the slope of the end of the central rib 10 and a radially extending flat portion 18 nesting against a radially extending flat fin 19 forming a part of the bracing member. The metal of the outer spoke casing portion 4 is then bent around the end of this fin 19 and continued in a flat fin engaging portion 20 downward to the lower extremity of the fin and then bent outward in a bottom portion 21 within the outer jaw casing where it is continued upward along the inside of the outer wall of this jaw casing in a reinforcing portion 22. This reinforcing portion 22 is continued to the edge of the jaw casing member and is curved and shaped to conform to the under marginal portion of the rim. Within this reinforcing portion and within the outer casing is a reinforcing cup member 23 which nests into the opening formed by the parts and engages the flat fin engaging portion on the one hand and the inner portion of the reinforcing portion 22 on the other. The outer edges of this cup are finished to conform to the inner surface of the rim to form a part of the jaw. The parts at this point may be secured by spot welding or any other means.

The several thicknesses of material comprising the radially extending flat portion 18 and the fin 19, the fin engaging flat portion 20, as well as the inner side of the cup, are slotted to form a bolt receiving slot 24.

The rim is held in place on the rim engaging jaw by means of a removable jaw preferably in the form of a drop forging comprising a substantially flat body portion 25 and a rim engaging jaw 26. This jaw is braced by suitable webs 27. The body portion 25 is beveled at its lower end to engage the shoulder 16 and is provided with a bolt opening 28 adapted to receive the shank 29 of a bolt 30, this shank passing through a spring 31, through the slot 24, and into the cup 23 where it is provided with a nut 32, which is sufficient in size to engage the side walls of the cup and prevent the nut from turning. By this arrangement it will be seen that when the lower end of the main body portion of the outer clamp is in engagement with the shoulder and the bolt is drawn up, the jaw 26 will force the rim into firm engagement with the opposite jaw structure already described. When the bolt is loosened, however, the outer jaw may be moved downward so that the rim is released, the spring serving to hold the jaw from moving loosely about its support and interfering with the removal of the rim.

Having described my invention, I claim:—

1. A wheel structure, comprising a filler block for the hub, front and rear plates attached thereto, each of which has radiating spoke portions, the edges of the spoke portions of the two plates being folded together into joints, and a sheet metal reinforcement within each spoke, said reinforcements being channeled longitudinally and having their edges secured in said spoke joints.

2. A wheel structure, comprising a filler block for the hub, front and rear plates attached thereto, each of which has radiating spoke portions, the edges of the spoke portions of the two plates being folded together into joints, and a sheet metal reinforcement within each spoke, said reinforcements being substantially of W-shape in cross section with outwardly extending edge flanges secured in said spoke joints.

3. A wheel structure, comprising a filler block for the hub, a rim, front and rear plates attached to said filler block, each of which has a radiating spoke portion, the edges of the spoke portions of the two plates being folded together into joints, and a sheet metal reinforcement within each spoke, said reinforcements being channeled longitudinally and having their edges secured in said spoke joints, the outer ends of said spoke portions and reinforcements being bent to form a stationary jaw at the end of each spoke, said rim being supported at one edge on said jaws, and a series of adjustable jaws engaging the other edge of said rim and coöperating with said stationary jaws for clamping the rim to the wheel.

4. A wheel structure, comprising a filler block for the hub, a rim, front and rear plates attached to said filler block, each of which has radiating spoke portions, the edges of the spoke portions of the two plates being folded together into joints, and a sheet metal reinforcement within each spoke, said reinforcements being substantially of W-shape in cross section with outwardly extending flanges secured in said spoke joints, the outer ends of said spoke portions and reinforcements being bent to form a stationary jaw at the end of each spoke, said rim being supported at one edge on said jaws, and a series of adjustable jaws engaging the other edge of said rim and coöperating with said stationary jaws for clamping the rim to the wheel.

5. A wheel structure, comprising a filler block for the hub, a rim, front and rear plates attached to said filler block, each of which has a radiating spoke portion, the edges of the spoke portions of the two plates being folded together into joints, and a sheet metal reinforcement within each spoke, said reinforcements being channeled longitudinally and having their edges secured in said spoke joints, the outer ends of said spoke portions and reinforcements being bent to form a stationary jaw at the end of each spoke and a hollow pocket, a reinforceing cup lying in said pocket, said rim being supported at one edge on said jaws, and a series of adjustable jaws engaging the other edge of said rim and coöperating with said stationary jaws for clamping the rim to the wheel.

6. A wheel structure, comprising a filler block for the hub, a rim, front and rear plates attached to said filler block, each of which has a radiating spoke portion, the edges of the spoke portions of the two plates being folded together into joints, and a sheet metal reinforcement within each spoke, said reinforcements being substantially of W-shape in cross section with outwardly extending flanges secured in said spoke joints, the outer ends of said spoke portions and reinforcements being bent to form a stationary jaw at the end of each spoke and a hollow pocket, a reinforcing cup lying in said pocket, said rim being supported at one edge on said jaws, and a series of adjustable jaws engaging the other edge of said rim and coöperating with said stationary jaws for clamping the rim to the wheel.

7. A wheel structure, comprising a filler block for the hub, a rim, front and rear plates attached to said filler block, each of which has a radiating spoke portion, the edges of said spoke portions of the two plates being folded together into joints, and a sheet metal reinforcement within each spoke, said reinforcements being channeled longitudinally and having their edges secured in said spoke joints, the outer ends of said spoke portions and reinforcements being bent to form a stationary jaw at the end of each spoke and provided with a radially extending slot, said rim being supported at one edge on said jaws, a series of adjustable jaws engaging the other edge of said rim, bolts extending through said adjustable jaws and through said slots in the stationary jaws, and nuts on said bolts and inclosed within said spokes.

8. A wheel structure, comprising a filler block for the hub, a rim, front and rear plates attached to said filler block, each of which has a radiating spoke portion, the edges of the spoke portions of the two plates being folded together into joints, and a sheet metal reinforcement within each spoke, said reinforcements being substantially of W-shape in cross section with outwardly extending flanges secured in said spoke joints, the outer ends of said spoke portions and reinforcements being bent to form a stationary jaw at the end of each spoke and provided with a radially extending slot, said rim being supported at one edge on said jaws, a series of adjustable jaws engaging the other edge of said rim, bolts extending through said adjustable jaws and through said slots in the stationary jaws, and nuts on said bolts and inclosed within said spokes.

In testimony whereof I affix my signature in presence of two witnesses as follows:

FRED TAYLOR.

Witnesses:
F. O. FARQUHARSON,
C. H. SHOTZBARGER.